Oct. 21, 1930.                    W. E. SHIVELY                    1,779,400
                               METHOD OF MAKING TIRES
                                 Filed Nov. 21, 1929

Inventor
Walter E. Shively
By R. S. Trogner
Attorney

Patented Oct. 21, 1930

1,779,400

UNITED STATES PATENT OFFICE

WALTER E. SHIVELY, OF AKRON, OHIO, ASSIGNOR TO THE GOODYEAR TIRE & RUBBER COMPANY, OF AKRON, OHIO, A CORPORATION OF OHIO

METHOD OF MAKING TIRES

Application filed November 21, 1929. Serial No. 408,759.

This invention relates to pneumatic tires, and it has particular relation to methods of constructing and arranging the elements of the bead portions of such tires.

One object of the invention is to provide a method of building tires which involves replacing a temporary bead element with a permanent bead ring.

Another object of the invention is to provide a method of building a tire by which an endless bead may be employed within the endless loops of a tire whose construction involves gathering or shirring the looped edges of a cylindrical band.

In building one kind of flat-built tires, a cylindrical band is provided which is shaped by shirring or gathering looped edges of the band upon bead elements, and then inflating a shaping member therein. It is necessary to clamp, splice, or otherwise secure the ends of such bead elements, which are not endless, after the edges of the band have been gathered. Such process is undesirable, because the resulting bead construction is not uniform circumferentially, and it is difficult to obtain a proper permanent union between the bead elements and the edges of the tire bands through which they have been threaded. Moreover, in securing the ends of the bead elements, which are not continuous, flaws are likely to occur in the connection.

According to this invention, a temporary bead is threaded through loops at the edges of the band of tire building material. After such edges have been gathered and the tire properly shaped, the portions of the band adjacent the bead elements are slit for the purpose of removing the latter. Then the slit plies are separated for the purpose of receiving endless bead rings of proper size which are inserted therebetween, and the edges defining the slit portions are lapped about the inner circumferential portions of the beads. The permanent bead ring has a materially greater diameter than the diameter of the temporary bead element, thus providing ample material to insure a firm overlapping connection about the beads.

For a better understanding of the invention, reference may now be had to the accompanying drawings, forming a part of the specification, of which:

Figure 1:
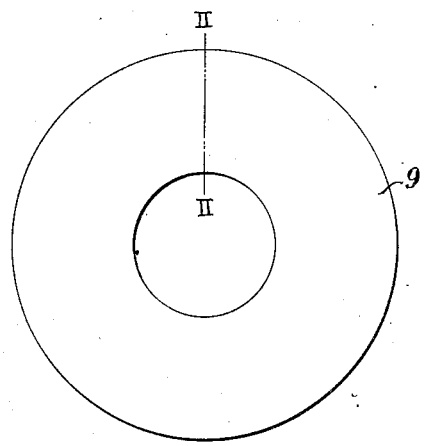
Figure 1 is a side-elevational view of a tire constructed according to the invention.

In practicing the invention, an endless band 9 is provided, which is composed of plies 10 of rubberized cord or fabric tire building material, and has loops 11 at its edges, through which bead elements 12 are threaded. These elements may be in the form of fabric or metallic members that are inserted through openings 13 in the loops, and the edge portions of the band at the loops are gathered thereon until they are confined about a relatively small circumference. An inflatable member 14, inserted within the band is then inflated for the purpose of shaping the tire into the configuration indicated by Figure 2. The tire band in this condition is of substantially its final shape and the fabric is condensed and set about the bead portions thereof.

Figure 2:
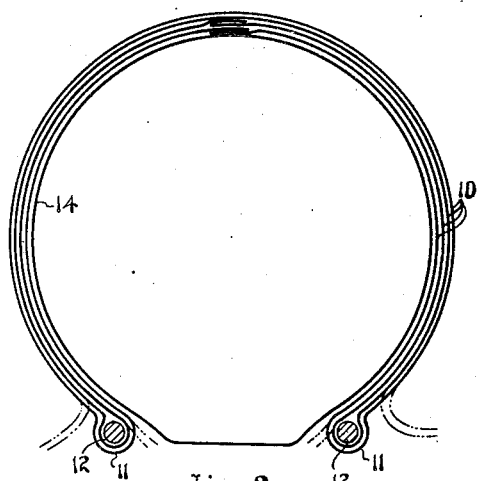
Figure 2 is a cross-sectional view, on a larger scale, taken substantially along the line II—II of Figure 1, and including an inflatable member in the tire.
Figure 3:
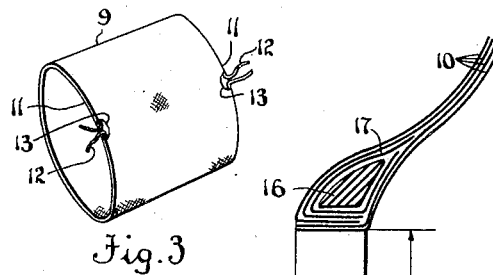
Figure 3 is a perspective view of a band employed in building a tire according to the invention.
Figure 4:
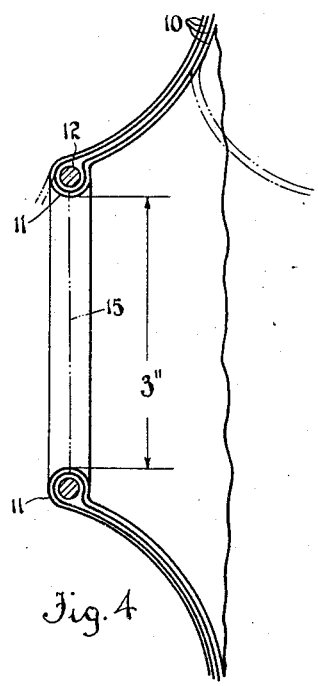
Figure 4 is a fragmentary view, on a larger scale, of the bead portions of a tire, indicating one step of the method employed in building it.
Figure 5:
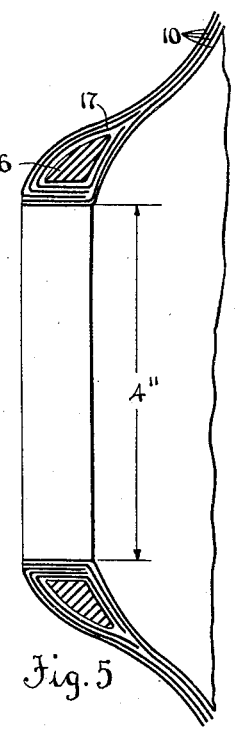
Figure 5 is a fragmentary view, on a larger scale, of the bead portions of a completed tire.

Then the looped and gathered edges of the band are slit along the line indicated at 15, and the slit plies 10 separated a short distance along the side of the tire toward the tread, as well as from the temporary bead elements 12 which are removed. Endless bead rings 16 of materially greater diameter than the bead elements 12 in the form shown by Figure 2 are inserted to replace the latter, and the plies 10 are lapped about the inner circumference of the bead rings, as indicated by Figure 5. For example, temporary beads 12 of approximately three inches in diameter are replaced by permanent beads of approximately four inches in diameter. Conventional anchoring strips 17 are secured to the bead ring 16 before it is inserted in the tire, and in the form shown by Figure 5, the tire assembly is vulcanized in the manner well known in the art.

Although I have illustrated only one form which the invention may assume, and have described that form in detail, it will be apparent to those skilled in the art that the invention is not so limited but that various modifications may be made therein without departing from the spirit of the invention or from the scope of the appended claims.

What I claim is:

1. A method of building tires which comprises applying a bead element of a predetermined size to a tire carcass, and substituting a bead of a different size for the first-mentioned bead.

2. A method of building tires which comprises applying bead elements in annular form to the edge portions of a band of tire-building material, shaping the band into tire form, removing the bead elements and applying bead rings of materially greater diameter than the inner diameter of the shaped band.

3. A method of building tires which comprises shirring the edge portions of a band of tire-building material upon bead elements until they assume a predetermined relatively small diameter, removing the bead elements, and inserting bead rings of materially greater diameter than the first-mentioned bead elements.

4. A method of building tires which comprises threading bead elements through the edge portions of a band of tire-building material, shirring the edge portions upon the bead element until they assume relatively small circumferences, shaping the band into annular tire form, removing the bead elements, and applying endless bead rings of materially greater diameter than the bead elements to the edge portions of the band.

5. A method of building tires which comprises threading bead elements through the edge portions of a band of tire-building material, shirring the edge portions upon the bead elements until they assume relatively small circumferences, shaping the band into annular tire form, slitting the band adjacent the bead elements, removing the bead elements, and applying between the slit portions of the band of material bead rings of substantially greater diameter than the bead elements.

In witness whereof, I have hereunto signed my name.

Signed at Akron, in the county of Summit and State of Ohio, U. S. A., this 18th day of November, 1929.

WALTER E. SHIVELY.